(12) United States Patent
Holvoet et al.

(10) Patent No.: US 8,678,317 B2
(45) Date of Patent: Mar. 25, 2014

(54) INSTALLATION ASSEMBLY INCLUDING A FIXATION RAIL FOR ATTACHING DEVICES IN AN AIRCRAFT

(75) Inventors: Julie Holvoet, Toulouse (FR); Maximilien Fauvet, Toulouse (FR); Didier Reynes, Toulouse (FR); Marc Tomasi, Toulouse (FR); Laurent Rebolloso, Le Gres (FR); Luc Michelet, Cornebarrieu (FR)

(73) Assignee: Airbus Operations S.A.S., Toulouse (FR)

( * ) Notice: Subject to any disclaimer, the term of this patent is extended or adjusted under 35 U.S.C. 154(b) by 329 days.

(21) Appl. No.: 13/165,108

(22) Filed: Jun. 21, 2011

(65) Prior Publication Data

US 2012/0160962 A1 Jun. 28, 2012

(30) Foreign Application Priority Data

Jun. 22, 2010 (FR) .................................... 10 02611
Jul. 13, 2010 (FR) .................................... 10 02943

(51) Int. Cl.
*B64C 1/06* (2006.01)

(52) U.S. Cl.
USPC ........................................ 244/131; 244/132

(58) Field of Classification Search
USPC .................... 244/131, 132, 117 R, 129.1, 121
See application file for complete search history.

(56) References Cited

U.S. PATENT DOCUMENTS

| | | | |
|---|---|---|---|
| 6,883,753 | B1 | 4/2005 | Scown |
| 2005/0082431 | A1 | 4/2005 | Scown et al. |
| 2009/0026318 | A1* | 1/2009 | Gross et al. ................... 244/131 |
| 2009/0159750 | A1 | 6/2009 | Sayilgan et al. |
| 2012/0037756 | A1* | 2/2012 | Guthke et al. ................ 244/131 |

FOREIGN PATENT DOCUMENTS

FR 2 936 219 3/2010

OTHER PUBLICATIONS

U.S. Appl. No. 13/165,446, filed Jun. 21, 2011, Sabadie, et al.
U.S. Appl. No. 13/165,115, filed Jun. 21, 2011, Sabadie, et al.
U.S. Appl. No. 13/165,150, filed Jun. 21, 2011, Sabadie, et al.
French Preliminary Search Report issued Feb. 10, 2011, in French 10 02943, filed Jun. 21, 2011 (with English Translation of Category of Cited Documents).
U.S. Appl. No. 13/165,461, filed Jun. 21, 2011, Holvoet, et al.

* cited by examiner

*Primary Examiner* — Timothy D Collins
*Assistant Examiner* — Jamie S Stehle
(74) *Attorney, Agent, or Firm* — Oblon, Spivak, McClelland, Maier & Neustadt, L.L.P.

(57) ABSTRACT

A fastening assembly for the fastening of systems in an aircraft comprising frames, a skin, and clips between the skin and the frames. The fastening assembly includes: ramps, that extend between two consecutive frames of the aircraft; brackets for fastening the ramps to two of the clips situated respectively on two consecutive frames of the aircraft; system supports, fastened to the ramps, each system support being able to receive at least one system.

11 Claims, 7 Drawing Sheets

INSTALLATION ASSEMBLY INCLUDING A FIXATION RAIL FOR ATTACHING DEVICES IN AN AIRCRAFT

BACKGROUND OF THE INVENTION

This invention relates to a fastening assembly for the fastening of systems in an aircraft.

The structure of the fuselage of an aircraft usually is made up of frames extending in transverse planes, stringers extending more or less along a longitudinal direction of the aircraft outside the frames, and a skin that covers the said stringers and is fastened thereto. The skin also is fastened to the frames, through connecting pieces known under the name of "clip" or "stabilizer."

In the cabin in particular, the interior faces of the fuselage are covered successively by insulation blankets, producing a thermal and sound insulation of the cabin, and by covering panels the interior face of which remains visible from the cabin and thus forms a finish face. Between two successive frames of the fuselage, the skin of the said fuselage is covered by insulation blankets called field blankets, (called "field blankets" in English). Each frame of the fuselage is further covered by a blanket called frame blanket (called "frame blanket" in English). An overlap zone may be provided between consecutive frame and field blankets.

Between the insulation blankets and the covering panels, systems are arranged (equipment items, electrical cables, hydraulic and pneumatic systems . . . ).

These systems usually are fastened to the structure of the fuselage by localized fastening devices traversing the insulation blankets covering the said structure. Thus, for example, the electrical cables are fastened to the frames of the fuselage with the aid of localized fastening devices comprising a rod which traverses the frame and the blanket or blankets which cover it. These localized fastening devices also comprise washers for locking the rod on both sides of the frame, and a lug into which there engages a quick-clamping collar receiving one or more wirings. As regards the pipes provided for the circulation of conditioned air, they usually are fastened to the stringers, with the aid of localized fastening devices comprising a clamping collar borne by a support fastened to a stringer by screws; these screws traverse the stringer and field blanket covering the latter.

For fastening of the systems, it therefore is necessary to make holes in the structure of the fuselage as well as in the insulation blankets.

The holes made in the structure weaken the latter and therefore make it necessary to provide thickened zones or other structural reinforcements close to them. These holes therefore complicate the design of the fuselage.

Holes made in the insulation blankets degrade the insulation performances of the latter, creating as many thermal and acoustic bridges. They also reduce their watertightness (as it happens, the insulation blankets also have the function of draining, to the trough bottom of the fuselage, the water of condensation appearing on the skin of the aircraft). Moreover, the making of these holes considerably complicates the manufacture of the blankets and weights down the cost prices thereof. Thus for example, at each hole made on a blanket edge for fastening electrical cables to the frames (and for fastening the blankets themselves to the said frames), the layer of glass wool of the blanket must be replaced by a foam rubber disk, which facilitates making of the hole and reinforces the blanket around the said hole so as to prevent the blanket from tearing.

Moreover, in the event of belated modification (when the aircraft is in assembly phase for example) of the structure of the fuselage or of a system, it is necessary to make one or more additional holes in the blanket concerned and/or in the structural element concerned.

The making of an additional hole in a blanket is a particularly long and tedious process. To this end, it is advisable, in fact, to bond an adhesive strip on each face of the blanket at the location of the hole, cut out a disk in the blanket at the location of the hole with the aid of a first specific cutting tool, remove the blanket disk cut out in this manner and replace it with a foam rubber disk, again bond an adhesive strip on each face of the blanket so as to cover and hold the foam rubber disk, pierce the blanket in the center of the foam rubber disk with the aid of a second specific cutting tool so as to form the hole. When an additional hole is made in a blanket, it furthermore is necessary to fill up the henceforth unused hole in the blanket.

The belated making of holes in a structural element also poses a problem. These holes weaken the structure and, because they are not provided for during design of the fuselage, often make it necessary to add structural reinforcements. Moreover, when the structure is of a composite material, the making of a hole requires the use of a specific tool, generates chips that are harmful—and therefore hazardous for the operator in charge of making the hole—and may cause delaminations of the composite material around the hole. These problems are more difficult to control when making of the hole is not provided for at the outset, and is not done at the manufacturing site of the structure.

For all the reasons indicated above, it is desirable to limit the number of holes made in the structure and in the blankets for fastening the systems.

BRIEF SUMMARY OF THE INVENTION

The invention is intended to overcome these drawbacks by providing a fastening assembly that makes it possible to reduce the number of holes to be made, for purposes of fastening systems, in the structure of the fuselage of an aircraft and in the insulation blankets that cover this structure. In a preferred version, the invention proposes a fastening assembly allowing fastening of systems without any hole being made, either in the structure or in the insulation blankets.

Another objective of the invention is to provide a fastening assembly making it possible to avoid having to make additional holes in the structure of the fuselage or in the insulation blankets in the event of belated modification of this structure or of a system.

To this end, the invention proposes a fastening assembly, for the fastening of systems in an aircraft comprising frames, a skin and connecting parts between the skin and the frames, referred to as clips. The fastening assembly according to the invention is characterized in that it comprises:

- ramps, each ramp being adapted to extend between two consecutive frames of the aircraft,
- for each ramp, means for fastening the ramp allowing fastening of the said ramp to two clips situated respectively on two consecutive frames of the aircraft,
- system supports, fastened or adapted for being fastened to the ramps, each system support being able to receive at least one system.

The invention therefore consists in replacing the earlier localized fastening devices, anchored in the frames and stringers of the aircraft with the said of rods or screws traversing both the structure and the insulation blankets, with ramps extending between two consecutive frames and bearing system supports. These ramps are arranged between the two frames, and are fastened to clips connecting the said frames to the skin of the aircraft. No hole therefore is made in the frames or stringers for implementation of the fastening assembly according to the invention.

With such a fastening assembly, the ramps advantageously are disposed in front of a field blanket, which means that each ramp extends inside the space defined by the insulation of the fuselage; in other words, from the outside toward the inside of the aircraft, there are seen successively the skin of the aircraft, the stringers, the insulation blankets, the ramps. In this case, the ramps also contribute to holding the field blankets against the outside skin and the stringers of the structure of the aircraft.

The means for fastening each ramp preferably are connected to the clips by bonding, so that no hole is made in the clips. In this preferred version, implementation of the fastening assembly according to the invention does not require making any holes in the structure of the fuselage of the aircraft.

The clips connecting each frame to the skin of the aircraft generally are evenly distributed along the said frame. Consequently it is easy to position the ramps evenly along the frames, with a constant distance between two successive ramps, with a view to an optimal holding of the systems.

Furthermore, once the fastening assembly is implemented, only the means for fastening the ramp, or more precisely a part thereof, traverse the insulation produced by the field and frame blankets, and this irrespective of the number of systems borne by the ramp. The insulation therefore is traversed at a considerably fewer number of points in comparison with the earlier known devices. Moreover, these through-points occur close to the frames; therefore it is possible to configure the means for fastening the ramps so that these through-points each are implemented at the joining between a field blanket and a frame blanket. Under these conditions, no hole has to be provided in the insulation blankets for the implementation of the fastening assembly according to the invention. At the very most it is preferable to provide notches in the edges of the blankets, at the means for fastening the ramps, if a substantial covering of the field and skin blankets is desired.

Finally, besides their function of receiving system supports, the ramps according to the invention, which extend in front of the field blankets, also have a function of holding these blankets in position against the stringers. The presence of these ramps therefore makes it possible to reduce the anchoring points of the field blankets to the structure to the bare minimum. In this way, the holes to be made in the structure and in the field blankets for fastening the latter are considerably minimized. Depending on the shape of the fuselage, the weight of the blankets, the rigidity of the ramps, etc., it even may be contemplated not to provide any anchoring of the field blankets to the structure; in this case, the field blankets do not have any hole and are held in position only by the ramps.

Preferably, each ramp is adapted for extending more or less horizontally between two consecutive frames of the aircraft.

Advantageously, for each ramp, the means for fastening the ramp comprise:
  two brackets, each bracket having a first branch intended to be fastened to a clip of the aircraft and a second branch provided with a slot,
  at each of the ends of the ramp, a securing lug adapted for being able to be inserted in the slot of one of the said brackets, each securing lug comprising at its free end a flange which forms a stop countering displacement of the securing lug once same is inserted in the slot.

Advantageously, each ramp comprises at each of its ends, a fin, referred to as blanket holding fin, extending more or less orthogonally to an axial direction of the ramp and intended to extend in a direction opposite to the skin of the aircraft for purposes of holding an insulation blanket referred to as frame blanket.

Another embodiment provides that the ramps are disposed at the field blankets. In this case, it then is provided, for example, that at least one ramp has an overall elongated form with an I-shaped section, having a central body from which two flanges extend on two opposite sides, in each instance, and that the housing formed between two flanges disposed on the same side of the central body is adapted for receiving an insulation blanket flank.

In this embodiment, each ramp having an overall elongated form with an I-shaped section is made, for example, in three parts, a lower part comprising two lower flanges, a central part and an upper part comprising two upper flanges, and a connecting part is disposed at each ramp end, ensuring on the one hand the connection of the three parts of the ramp and on the other hand the connection of the ramp to a clip.

According to a first embodiment of the system supports, each system support comprises a base adapted for being coupled with a housing arranged on a ramp, each ramp advantageously comprising a plurality of housings (for receiving a plurality of systems). Preferably the housings arranged on the ramps are all identical and the bases of the system supports are all identical, irrespective of the systems to be fastened. Each system support then may be coupled to any one of the housings arranged on a ramp. This characteristic makes the systems interchangeable in terms of position between the frames.

Preferably, the base of each system support and each of the housings arranged on the ramps have complementary sections and comprise locking means countering displacement of the system support. It is to be noted that the locking means may result from the complementary shape of the base and of the housing, and/or comprise complementary structural means.

Various embodiments are possible for the bases of the system supports and the housings on the ramps. For example, the base of each system support and each housing have complementary dovetail sections. As a variant, each of the housings arranged on the ramps is made up of at least one hole, preferably circular, and the base of each system support comprises at least one pin, preferably with circular section, equipped at its free end with an elastically deformable conical head (locking means) able to be inserted into a hole of a ramp and counter displacement of the support system.

According to a second embodiment of the system supports, for each ramp, each system support comprises on the one hand a recess formed on the ramp having a section adapted for receiving circular cylindrical systems having various diameters, and on the other hand at least one connection (collar, flexible tongue piece . . . ) and connection anchoring means on both sides of the said recess. Preferably, each system support also comprises connection anchoring means in the central part of the recess.

The invention extends to an aircraft comprising at least one fastening assembly according to the invention and systems fastened with the aid of the said fastening assembly.

BRIEF DESCRIPTION OF THE SEVERAL
VIEWS OF THE DRAWINGS

Other details and advantages of this invention will become apparent on reading of the following description, which makes reference to the attached schematic drawings and concerns preferential embodiments, provided by way of non-limitative examples. On these drawings.

DETAILED DESCRIPTION OF THE INVENTION

Figure 1:
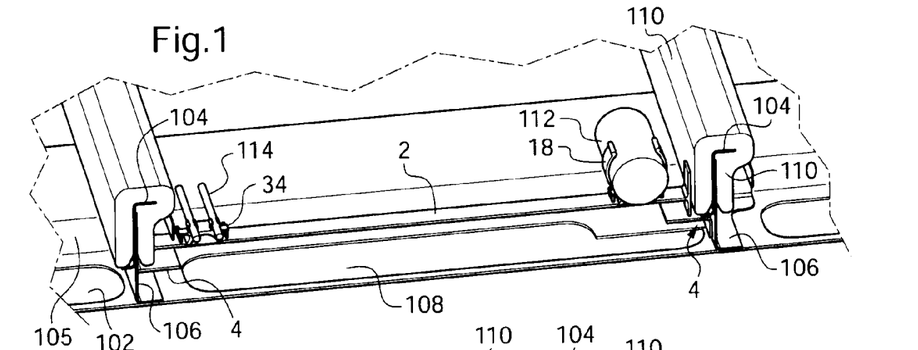
FIG. 1 is a schematic view in perspective, intersected by a longitudinal plane, of an aircraft fuselage portion between two consecutive frames, on which there appears a ramp of a fastening assembly according to the invention.
Figure 2:
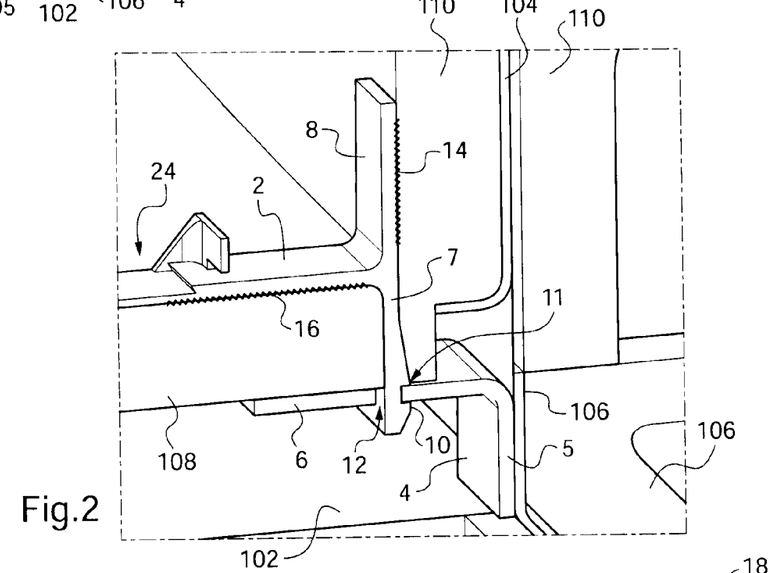
FIG. 2 is a view in perspective, intersected by a longitudinal plane, of a part of the ramp illustrated on FIG. 1, FIGS. 3 and 4 are views in perspective of a first embodiment of a system support of a fastening assembly according to the invention.

An aircraft fuselage, such as the one that may be seen on FIGS. 1 and 2, has a structure ordinarily comprising frames 104 extending crosswise and having a Z-shaped section, stringers 105 extending along the longitudinal direction of the fuselage outside frames 104, and a skin 102 formed outside stringers 105 and fastened directly thereto. Skin 102 also is fastened to frames 104 by connecting parts, known under the name of clips 106.

The structure of the fuselage is covered, particularly in the cabin of the aircraft, by insulation blankets providing a thermal and acoustic insulation of the cabin. These insulation blankets comprise field blankets 108 extending between frames 104, and frame blankets 110 covering said frames 104.

Various systems, including for example ducts 112 for circulation of conditioned air, and electrical cables 114, are arranged in front of the field blankets. According to the invention, these systems are fastened to the structure of the fuselage by a fastening assembly comprising a plurality of ramps 2 (only one of these ramps being shown on FIG. 1) as well as system supports, such as supports 18 and 34 visible on FIG. 1, borne by the said ramps.

In all of the following, the fastening assembly according to the invention is seen and described assembled and mounted in an aircraft.

Each ramp 2 of this assembly extends more or less horizontally between two consecutive frames 104 of the fuselage. In other words, each ramp 2 extends more or less along the longitudinal direction of the fuselage, practically from one frame to another. Between two consecutive frames 104, a plurality of ramps 2 thus are arranged, preferably evenly distributed over the height of the fuselage (that is to say along the frames). The number of ramps to be arranged between two consecutive frames is selected so as to guarantee a reliable fastening of the systems while limiting as much as possible the weight contributed by the ramps. Thus, for example, at least two ramps, preferably three ramps, are provided between the floor and the ceiling of the cabin of the aircraft.

Each ramp 2 is fastened, at each of its ends, to a clip 106 of the fuselage. For this purpose, the fastening assembly according to the invention comprises, for each end of each of the ramps 2, a bracket 4 such as illustrated on FIG. 2. Each bracket 4 comprises on the one hand a first branch 5 for fastening thereof to a clip 106 of the fuselage; this fastening may be accomplished by bonding first branch 5 onto clip 106. Each bracket 4 comprises on the other hand a second branch 6 in which the end of ramp 2 comes to be anchored. For this purpose, second branch 6 has a slot 12, and the end of ramp 2 has a securing lug 7 which comes to be inserted into slot 12 of the bracket. This securing lug 7 comprises a flange 10 at its free end. Slot 12 therefore has a width at least equal to the thickness of this flange 10 so as to allow insertion of the said flange into the said slot.

In inoperative position, securing lug 7 forms an angle greater than 90° with the axial direction of ramp 2. When it is inserted into slot 12 in a position referred to as anchoring position (as illustrated on FIG. 2), securing lug 7, which is slightly elastic in bending, extends more or less orthogonally to the axial direction of the ramp. In anchoring position, securing lug 7 therefore is elastically pulled back toward branch 5 of the bracket. Flange 10 of securing lug 7 then forms a stop countering displacement of the said securing lug. In order to free ramp 2 from bracket 4, it suffices to exert a pressure against securing lug 7 of the said ramp in a direction opposite to branch 5 of the bracket so as to position flange 10 facing slot 12, then to pull on ramp 2 in a direction opposite to skin 102 of the fuselage.

Preferably, securing lug 7 furthermore has a shoulder 11 above flange 10, which shoulder 11 forms a stop countering the sinking of securing lug 7 into slot 12 of bracket 4. In other words, flange 10 and shoulder 11 define a notch into which an edge of slot 12 comes to engage when the securing lug is in anchoring position.

At each end of each ramp 2, bracket 4 and securing lug 7 of the ramp—provided respectively with a slot 12, a flange 10 and a shoulder 11—create means for fastening ramp 2 allowing fastening of the said ramp to a clip 106 of the fuselage. Fastened in this way to two clips 106 borne by two consecutive frames 104, ramp 2 extends in front of a field blanket 108 (see FIG. 2). Each of its ends moreover comes to bear against a frame blanket 110. Advantageously, ramp 2 comprises a fin 8 that extends more or less orthogonally to the axial direction of the ramp, in the continuation of securing lug 7, when the latter is in anchoring position. In other words, fin 8 extends more or less parallel to the core of frame 104 situated nearby. This fin 8 makes it possible to hold frame blanket 110 pressed against frame 104; hereinafter it is called blanket-holding fin. Preferably, blanket-holding fin 8 bears an attachment strip 14 of Velcro® (velours-hooks) type intended to cooperate with a complementary strip bonded or stitched onto frame blanket 110. These two strips contribute to holding frame blanket 110, preventing the latter from sliding along frame 104.

Similarly, each ramp 2 advantageously bears, on its face intended to be opposite a field blanket 108, an attachment strip 16 of Velcro type intended to cooperate with a complementary strip bonded or stitched onto field blanket 108. This strip 16 may extend over the entirety or over only a part of the length of ramp 2. It contributes to holding field blanket 108.

Figure 3:
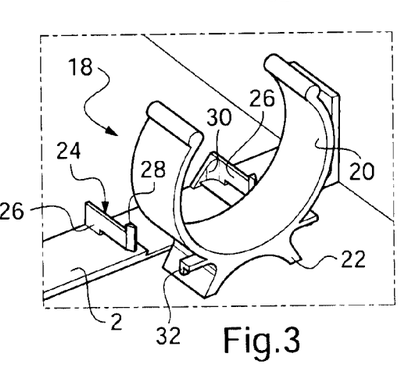
Figure 4:
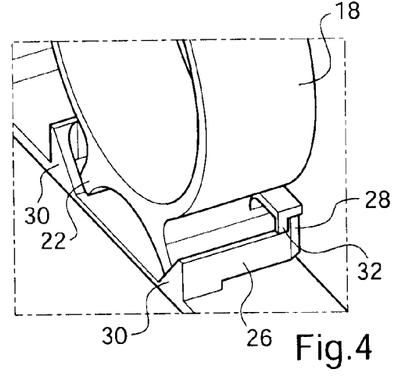

The fastening assembly according to the invention further comprises system supports. FIGS. 3 and 4 illustrate a first system support 18, in particular adapted for receiving a duct 112 for circulation of conditioned air, or another fluid duct. This system support 18 comprises on the one hand a base 22 for fastening thereof to ramp 2, and on the other hand a clamp 20, with a circular and open section, receiving duct 112.

Clamp 20 has an inside diameter corresponding more or less to the outside diameter of duct 112. It moreover has an elasticity both sufficiently great to allow insertion of duct 112 into the clamp and sufficiently weak to hold the said duct effectively in place.

Base 22 is adapted for being coupled with a housing 24 arranged on ramp 2, each ramp having a plurality of identical housings 24. Each housing 24 is made up of two slides 26 extending orthogonally to the axial direction of the ramp. Each slide 26 is integral with the ramp only over a part (including an end) of its length, referred to as fixed part, the other part of the slide remaining free. In inoperative position, the distance separating the free ends of the two slides 26 forming housing 24 is less than the width of base 22 of the system support. The free part of each slide 26 may be moved away from the other slide by elasticity so as to allow insertion of base 22 of the system support in housing 24. At its fixed end, each slide 26 has a return forming a stop 30 against which base 22 of system support 18 comes to bear when the latter is in fastening position. At its free end, each slide 26 has a locking lug 28 able to cooperate with a locking pin 32 of the system support for locking system support 18 in fastening position. Slides 26, return 30, lug 28 and pin 32 counter displacements of system support 18 relative to ramp 2 in the plane of the said ramp. As to displacements of system support 18 orthogonally to the plane of ramp 2, they are prevented by a slightly dovetail shape of slides 26 of the ramp and of base 22 of the system support.

Figure 5:
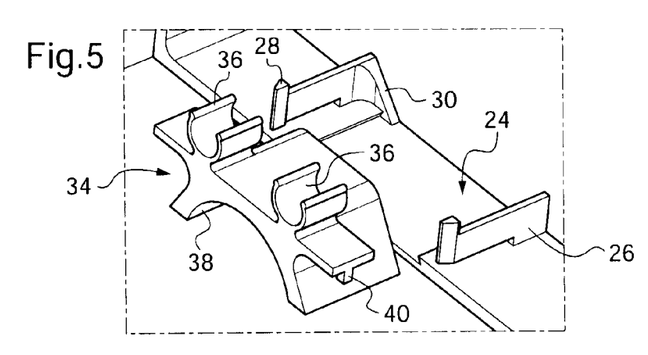
FIGS. 5 and 6 are views in perspective of a second embodiment of a system support of a fastening assembly according to the invention.
Figure 6:
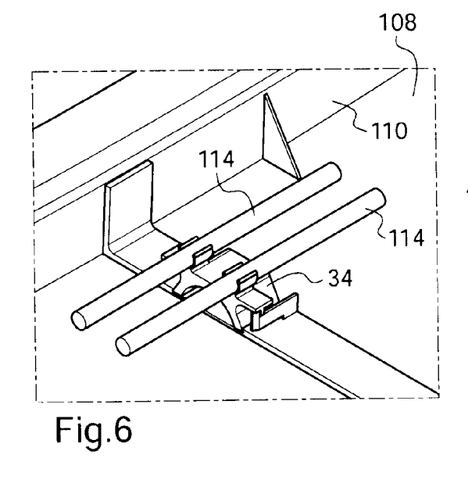

FIGS. 5 and 6 illustrate a second system support 34, especially adapted for receiving two cables 114 or other small-section systems. This system support 34 comprises a base 38 identical to base 22 of system support 18, and two locking pins 40 identical to pins 32 of system support 18. Like system support 18, system support 34 therefore may be laid out and fastened in any one of housings 24 arranged on each ramp 2.

System support 34 further comprises two clamps 36 with circular and open section, for receiving two cables 114. Each clamp 36 has an inside diameter corresponding more or less to the outside diameter of a cable 114, and an elasticity adapted for allowing insertion and holding of the said cable in the said clamp.

Figure 7:
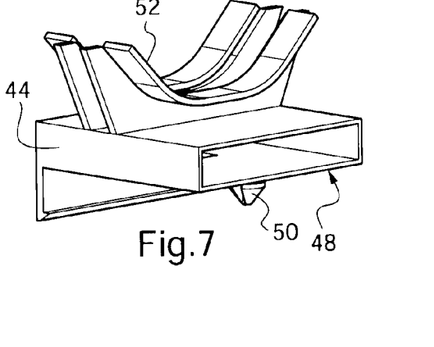
FIGS. 7 and 8 are views in perspective of a third embodiment of a system support of a fastening assembly according to the invention.
Figure 8:
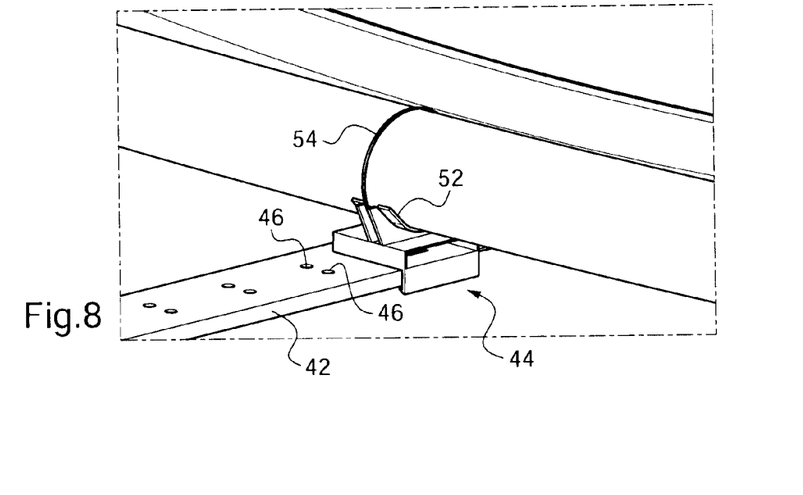

FIGS. 7 and 8 illustrate another embodiment of a system support according to the invention. There may be seen there a system support 44 able to receive a fluid duct 112 and intended to be fastened onto a ramp 42. Ramps 2 and 42 differ by the shape of the housings that are arranged therein for purposes of fastening system supports. Apart from these housings, ramps 2 and 42 preferably are identical (in particular as regards the fastening means allowing fastening of the ramps to the clips of the aircraft). Each housing arranged in ramp 42 for fastening a system support 44 is made up of a pair of circular through-holes 46 (the two holes of the pair being facing for example along the transverse direction of the ramp). As to support system 44, it comprises a base 48 comprising two pins 50, each pin 50 having a conical locking head able to be elastically deformed. Such a system support 44 is fastened onto ramp 42 by fitting its two pins 50 into two circular holes 46 of the ramp. The conical head of each pin 50 has a large base with diameter greater than the diameter of holes 46. Compressed during insertion of pin 50 into hole 46, the said conical head relaxes at the end of the hole and then counters displacement of the support system.

Support system 44 further comprises a seat 52, able to support a fluid duct 112, and a tongue piece with a self-locking fastener forming a link 54 able to surround and hold the said duct.

Figure 9:
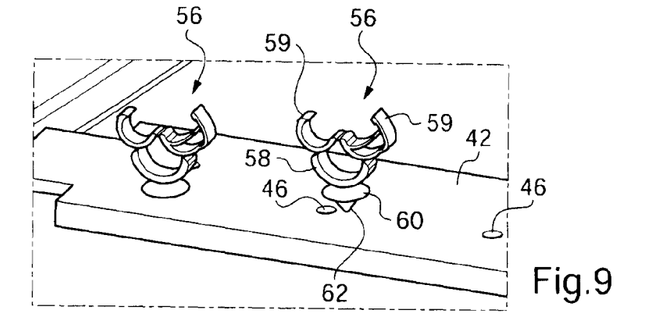
FIGS. 9 and 10, are views in perspective of a fourth embodiment of a system support of a fastening assembly according to the invention.
Figure 10:
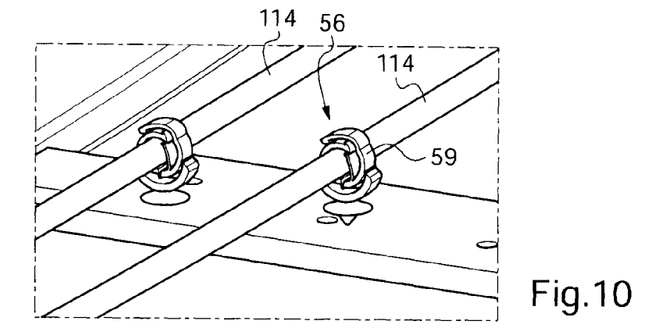

For the support of electrical cables, it is possible to provide system supports (not shown) comprising on the one hand a base identical to base 48 of support 44 and on the other hand means for fastening one or more cables, such one or more links possibly each associated with a seat (of smaller section in comparison with the one illustrated on the Figures). As a variant, system supports 56 such as those shown on FIGS. 9 and 10 may be used. Each system support 56 comprises a base 60 comprising a sole pin 62, identical to pin 50 described previously and consequently able to become fitted and locked into a hole 46 of ramp 42. Each system support 56 further comprises a base 58 bearing two jaws 59. Base 58 has the shape of a curved band. Each of its two ends forms a hinge onto which a jaw 59 is jointed so as to be able to pivot in relation to base 58. Each of jaws 59 is itself in the shape of a curved band. The two jaws 59 are connected to one another by a third hinge. In closed position (see FIG. 10), jaws 59 define a cylindrical housing of overall circular section the diameter of which corresponds more or less to the diameter of an electrical cable 114. In open position (see FIG. 9), jaws 59 are pivoted approximately 90° outward in relation to the closed position and thus form a W. A simple pressure on cable 114 placed at the center of this W makes it possible to close jaws 59 and in this way to grip cable 114. System support 56 is locked in closed position by virtue of the presence of shoulders formed at the free ends of jaws 59, these shoulders forming a set of complementary hooks.

Figure 11:
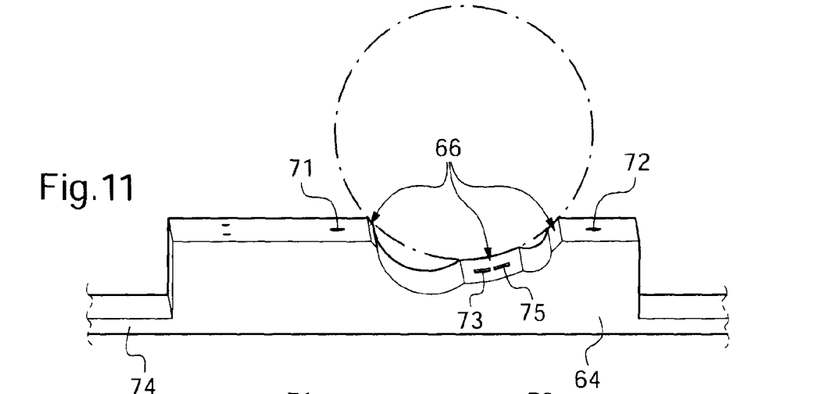
FIGS. 11 and 12 are views in perspective of a fifth embodiment of a system support of a fastening assembly according to the invention.
Figure 12:
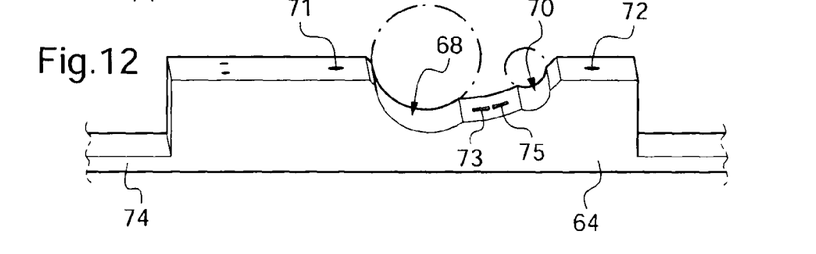

FIGS. 11 and 12 show another embodiment of a system support according to the invention. Such a system support 64 makes it possible to fasten to a ramp 74 a conditioned air duct 112, or one or more electrical cables 114, or even an electrical cable 114 and another system of diameter intermediate between a cable and an air duct. This system support 64 comprises a recess 66 formed in a zone of ramp 74 of increased thickness. This recess 66 has a plurality of circular cylindrical portions (the term circular here meaning that the cylindrical portion has a section in the shape of an arc of a circle) having different diameters. There may be seen in particular a circular portion 70 the diameter of which corresponds more or less to that of an electrical cable 114, and a circular portion 68 with larger diameter. Recess 66 also has cylindrical portions 66, preferably circular, which together define a circular cylindrical housing with large diameter for receiving a fluid duct 112. System support 64 further comprises a slot 71, 72 on each side of recess 66 and two slots 73, 75 between circular portions 68 and 70 of the said recess. Each of these slots may receive a link with self-locking fastener (not shown). In this way it is possible to fasten a fluid duct 112 with the aid of a link anchored in slots 71 and 72, or as a variant, a cable 114 with the aid of a link anchored in slots 75 and 72 and another system with intermediate diameter with the aid of a link anchored in slots 71 and 73.

FIGS. 13 to 20 illustrate an embodiment variant of a fastening assembly according to this invention. There is found again here a similar structure comprising frames (not shown)

similar to frames 104 from FIG. 1. A skin is fastened to the frames by clips 106 (FIGS. 13 and 14).

The skin is covered by a field blanket 108 extending on the one hand between the frames of the structure and on the other hand between two successive ramps 142.

Figure 13:
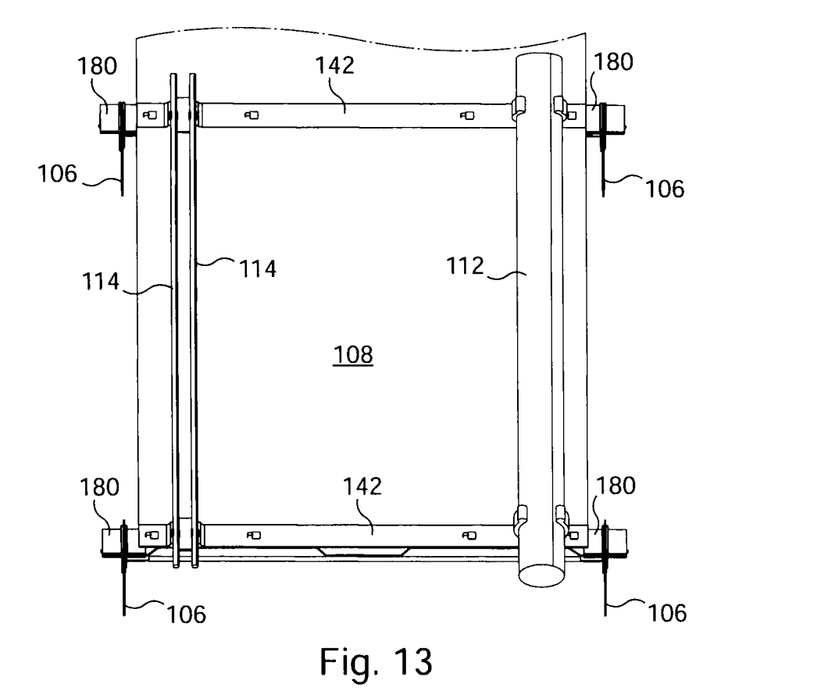
FIG. 13 is a schematic view from above of an aircraft fuselage portion between two consecutive frames, on which there appear two ramps of an embodiment variant of a fastening assembly according to this invention.
Figure 14:
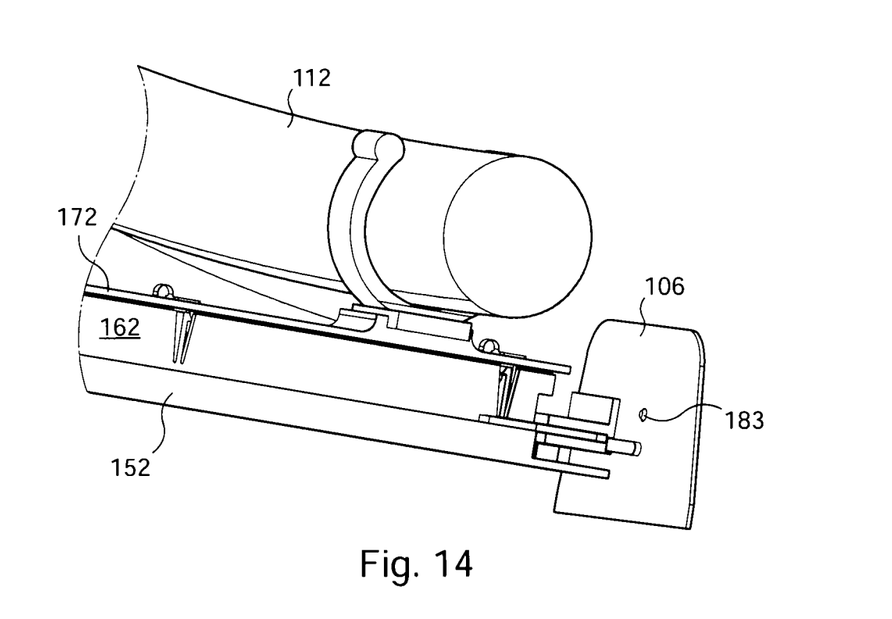
FIG. 14 is a view on an enlarged scale illustrating the fastening of one end of a ramp shown on FIG. 13.

A duct 112 for circulation of conditioned air, and electrical cables 114 that are arranged in front of field blankets 108 have been shown on FIG. 13. These systems are fastened to the structure of the fuselage through ramps 142 such as those shown on FIG. 15. As for the embodiment described with reference to FIGS. 1 to 12, each ramp 142 extends more or less horizontally between two consecutive frames of the fuselage, being fastened at each of its ends to a clip 106 of the fuselage.

Figure 15:
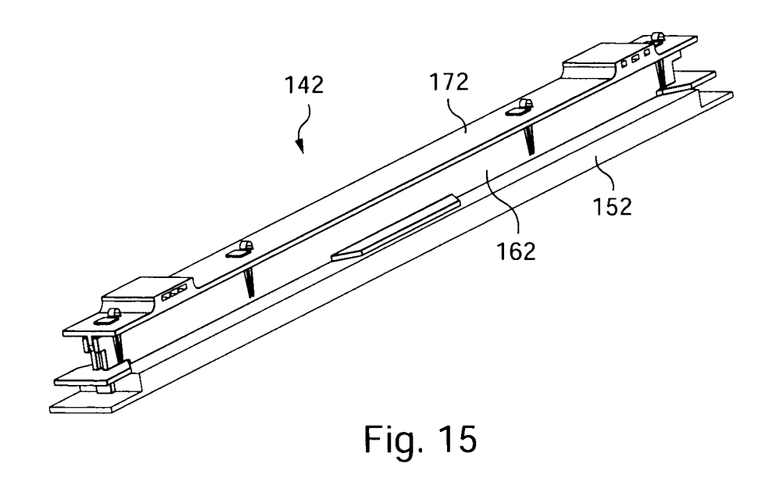
FIG. 15 shows a ramp in perspective.

In this embodiment, ramp 142 is made up of three parts: a lower part 152, a central part 162 and an upper part 172.

Figure 16:
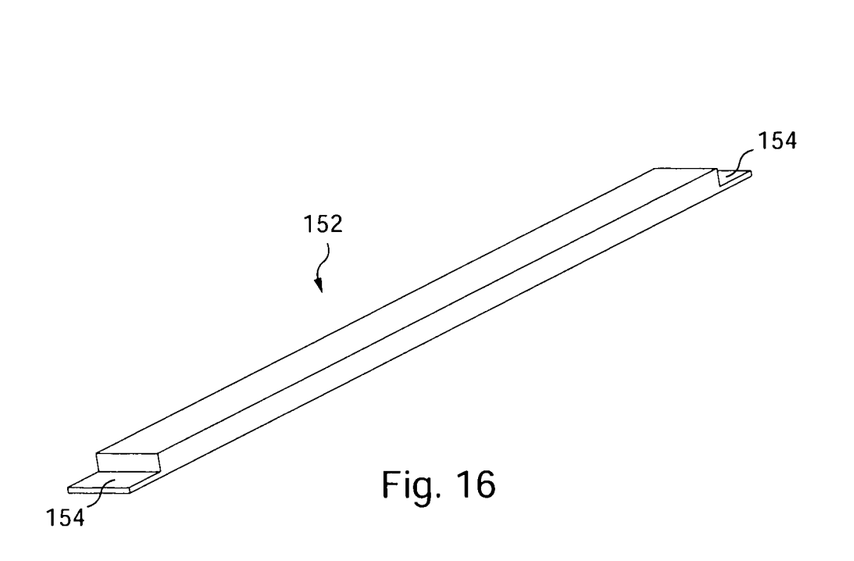
FIG. 16 shows a first part of the ramp shown on FIG. 15.
Figure 17:
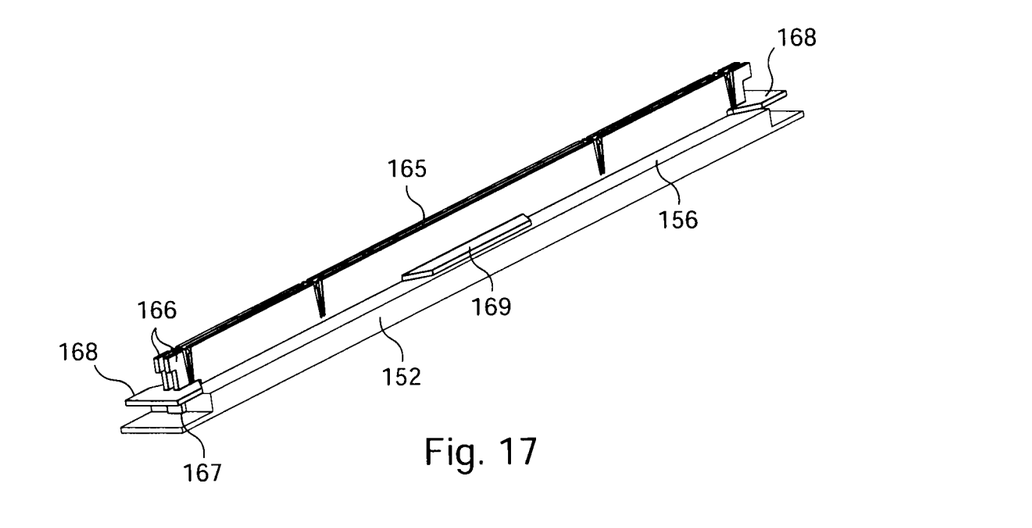
FIG. 17 shows the first part of FIG. 16 topped by a second part of the ramp from FIG. 15.

Lower part 152 is shown on FIG. 16. It is in the form of a sectional bar with rectangular section. It has at each of its ends a tongue piece 154 of lesser thickness than the central portion of lower part 152.

Central part 162 is in the form of a sectional part with U-shaped section. The base of the U is very narrow in comparison with the height of the branches. As illustrated on FIG. 17, the base of central part 162 is centered on lower part 152. Space 165 between branches 166 of central part 162 has a width on the same order of magnitude as the thickness of each of the branches 166. At each of its ends, the central part bears a tongue piece 168 that extends in the plane of its base, parallel to tongue pieces 154. Central tongue pieces 169 which make it possible to give central part 162 a better seating on lower part 152 also are seen. The presence of transverse slots made in central part 162 also is seen.

Figure 18:
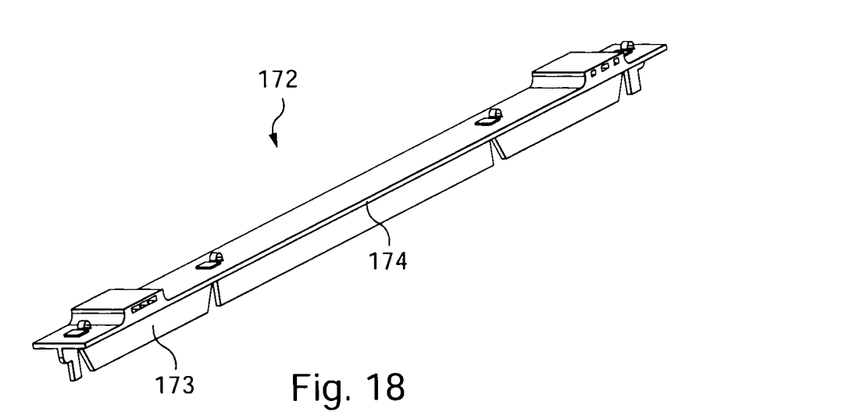
FIG. 18 shows in perspective a third part of the ramp shown on FIG. 15, and FIGS. 19 and 20 are views in perspective from two different angles of a connecting part providing connection of the ramp shown on FIG. 15 to a clip.

Upper part 172 is of overall sectional form with a T-shaped cross section. The upper part thus has a base 173 and two flanges subsequently called upper flanges 174. Upper part 172 is intended to become engaged in central part 162, base 173 coming to be inserted into space 165 between the two branches 166 of central part 162. When upper part 172 is engaged in central part 162, upper flanges 174 come to face the longitudinal edges of lower part 152 which form lower flanges 156. Assembly of lower part 152 with central part 162 and upper part 172 is accomplished, for example, by bonding and/or ratcheting. This assembly then forms a ramp 142 the general shape of which is that of an elongated part with an I-shaped cross section. This ramp 142 thus has a central body from which there extend on the one hand two lower flanges 156 and on the other hand two upper flanges 174. The space between a lower flange 156 and an upper flange 174, on one side of the central body of the ramp, is provided for receiving one end of a field blanket 108 and holding same.

Figure 19:
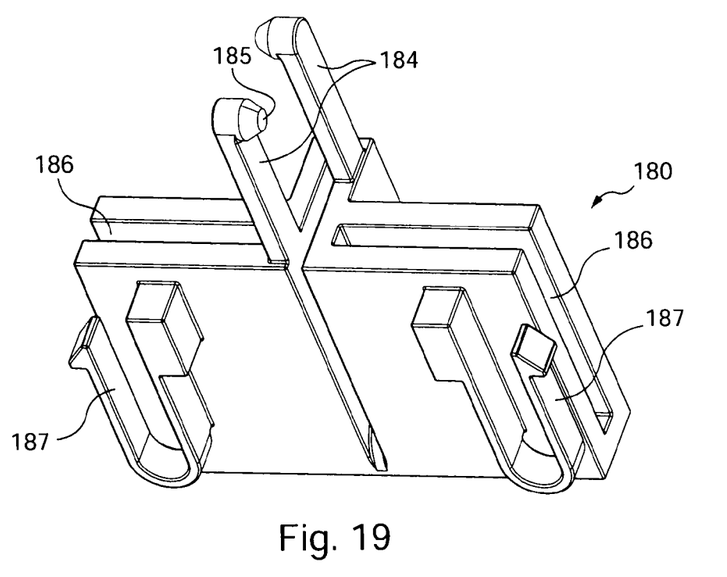
Figure 20:
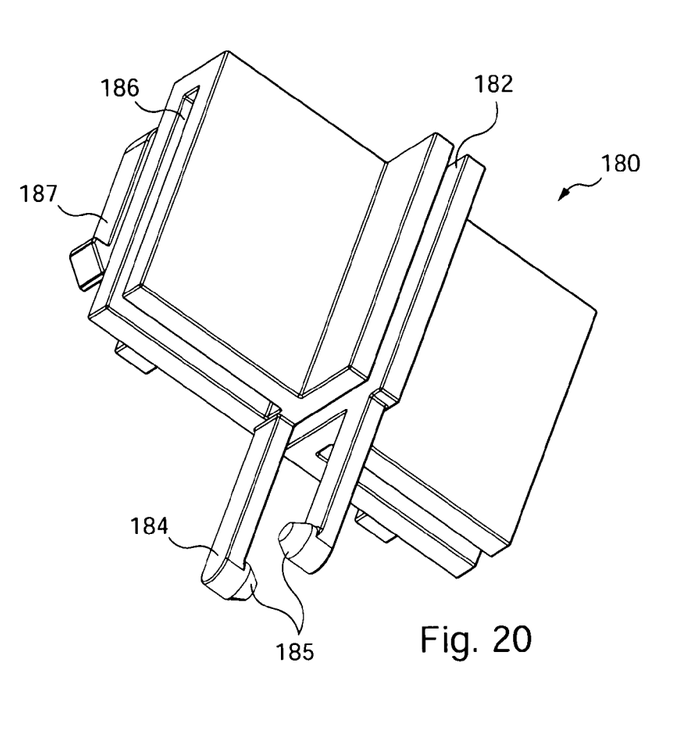

FIGS. 19 and 20 illustrate a connecting part 180 making it possible to connect the ramp to a clip 106. It is seen that this part 180 is intended to hold two ramp ends, a first end of a ramp situated on one side of a clip 106 and an end of another ramp situated on the other side of the same clip 106. This connecting part has a central slot 182 in which there is intended to be placed a part of clip 106 on which connecting part 180 is to come to be fastened. In order to maintain the position of connecting part 180 on corresponding clip 106, it is provided on the one hand to make a bore 183 in clip 106 and on the other hand to equip connecting part 180 with two elastic arms 184 (one for each ramp) provided at the end thereof with a pin 186 of a size adapted to corresponding bore 183 made in clip 106.

Connecting part 180 also has side slots 186, one side slot 186 being disposed on each side of central slot 182. Side slots 186 extend in a plane perpendicular to that of central slot 182.

Each of side slots 186 is intended to receive a tongue piece 168 of a central part 182 of a ramp 142. Underneath tongue pieces 168 there is seen the presence of a pawl 167. The latter is intended to come to cooperate with a ratchet 187 arranged underneath connecting part 180 for each of the two ramps.

The upper face of upper flanges 174 is intended to receive systems supports. This is illustrated on FIGS. 13 and 14. Any type of systems support may be used here and reference is made to the description of FIGS. 1 to 12 concerning the systems supports that may be used in this second embodiment of a fastening assembly according to the invention.

For positioning of a fastening assembly in accordance with this second embodiment, connecting parts 180 first of all are positioned on corresponding clips 106. An interlocking by bonding may be considered in order to guarantee an excellent fastening of connecting part 180 onto corresponding clip 106.

Lower part 152 of ramp 142 is bonded to central part 162. This lower part 152 preferably is made of an insulating foam rubber so as to make it possible, in mounted position, to achieve a linking of insulating materials between field blankets 108 situated on both sides of a ramp 142. Central part 162 then is mounted on corresponding connecting parts 180 by inserting a tongue piece 168 in a side slot 186 in each instance. Mounting is implemented by ratcheting with the aid of pawl 167 situated underneath tongue piece 168 of central part 162 and corresponding ratchet 187 of connecting part 180.

The frame blankets (not shown on FIGS. 13 to 20) then are positioned and held on the corresponding frames (also not shown). Field blankets 108 are disposed on the one hand between the frames and on the other hand between ramps 142. Upper part 172 then may come to engage in central part 162 and in this way come to hold the edges of field blankets 108 which come to rest against branches 166 of central part 162 of each ramp 142. Field blankets 108, when they are positioned between the frames and ramps 142 come to hold the free edges of the frame blankets (not shown).

Finally, the systems supports may be mounted on upper flanges 174 of the ramp and accommodate the corresponding systems, for example ducts 112 for circulation of conditioned air and/or electrical cables 114.

As is apparent from the preceding description, a fastening assembly according to this invention is easy to mount. It also has a great flexibility. In fact it is seen that all types of systems may be mounted on the ramps.

The mounting of a fastening assembly according to this invention does not require the use of any specific tool. It also makes it possible to avoid making holes in the structure during mounting.

This invention also has the advantage of making it possible to easily dismantle the systems mounted on the ramps and/or the insulation blankets.

The invention may be the subject of a great many variants in relation to the illustrated embodiments, so long as these variants are within the context defined by the claims.

The invention claimed is:

1. A fastening assembly for the fastening of systems in an aircraft comprising frames, a skin and clips between the skin and the frames, comprising:
   ramps that extend between two consecutive frames of the aircraft,
   means for fastening the ramps to two of the clips situated respectively on two consecutive frames of the aircraft,
   system supports fastened to the ramps, each system support configured to receive at least one system, and
   a blanket-holding fin at each end of the ramps extending substantially orthogonally to an axial direction of the ramp and extending in a direction opposite to the skin of the aircraft holding an insulation blanket that covers one of the two consecutive frames.

2. The fastening assembly according to claim 1, wherein the means for fastening the ramps comprise:
- two brackets, each bracket having a first branch to be fastened to one of the clips of the aircraft and a second branch provided with a slot,
- at the each end of the ramps, a securing lug configured to be inserted in the slot of one of the brackets, each securing lug comprising at a free end thereof a flange that forms a stop countering displacement of the securing lug once the securing lug is inserted in the slot.

3. The fastening assembly according to claim 1, wherein at least one of the ramps has an overall elongated form with an I-shaped section, having a central body from which two flanges extend on two opposite sides in each instance, and
- wherein a housing formed between two flanges disposed on the same side of the central body is configured to receive an insulation blanket flank.

4. The fastening assembly according to claim 3, wherein the at least one of the ramps having an overall elongated form with an I-shaped section, includes three parts, a lower part comprising two lower flanges, a central part, and an upper part comprising two upper flanges, and
- wherein a connecting part is disposed at each end of the at least one of the ramps, ensuring connection of the three parts of the at least one of the ramps and the connection of the at least one of the ramps to one of the clips.

5. The fastening assembly according to claim 1, wherein each system support comprises a base coupled with a housing arranged on each ramp, each ramp comprising a plurality of housings.

6. The fastening assembly according to claim 5, wherein the housings arranged on the ramps are all identical and the bases of the system supports are all identical, irrespective of the system to be fastened.

7. The fastening assembly according to claim 5, wherein the base of each system support and each of the housings arranged on the ramps have complementary sections and comprise locking means countering displacement of the system support.

8. The fastening assembly according to claim 7, wherein the base of each system support and each of the housings arranged on the ramps have complementary dovetail sections.

9. The fastening assembly according to claim 7, wherein each of the housings arranged on the ramps is made up of at least one hole, and the base of each system support comprises at least one pin equipped at a free end of the system support with an elastically deformable conical head to be inserted in a hole of the ramps and counter displacement of the system support.

10. The fastening assembly according to claim 1, wherein each system support comprises a recess formed on the respective ramp having a section for receiving circular cylindrical systems having various diameters, and
- at least one link and link anchoring means on sides of the recess.

11. An aircraft, comprising at least one fastening assembly according to one of claims 1, 2 or 3-10 and systems fastened with aid of the fastening assembly.

\* \* \* \* \*